United States Patent
Takayama

(10) Patent No.: US 8,170,362 B2
(45) Date of Patent: May 1, 2012

(54) EDGE-ENHANCEMENT DEVICE AND EDGE-ENHANCEMENT METHOD

(75) Inventor: Shinichi Takayama, Tokyo (JP)

(73) Assignee: Hoya Corporation, Tokyo (JP)

( * ) Notice: Subject to any disclaimer, the term of this patent is extended or adjusted under 35 U.S.C. 154(b) by 957 days.

(21) Appl. No.: 12/170,626

(22) Filed: Jul. 10, 2008

(65) Prior Publication Data

US 2009/0016635 A1    Jan. 15, 2009

(30) Foreign Application Priority Data

Jul. 13, 2007    (JP) .................. 2007-184008

(51) Int. Cl.
  *G06K 9/40*    (2006.01)
(52) U.S. Cl. ..................................... 382/266
(58) Field of Classification Search .................. 382/266, 382/270, 254, 190, 199
  See application file for complete search history.

(56) References Cited

U.S. PATENT DOCUMENTS

| | | | |
|---|---|---|---|
| 6,628,842 B1 * | 9/2003 | Nagao ........................... | 382/266 |
| 2007/0040906 A1 | 2/2007 | Iketani | |
| 2007/0041655 A1 | 2/2007 | Ozawa | |
| 2007/0222866 A1 | 9/2007 | Serizawa et al. | |

FOREIGN PATENT DOCUMENTS

| | | |
|---|---|---|
| JP | 2-001079 | 1/1990 |
| JP | 6-046293 | 2/1994 |
| JP | 2004-046329 A | 2/2004 |
| JP | 2006-142004 | 6/2006 |
| WO | 2006/041049 | 4/2006 |

OTHER PUBLICATIONS

English language Abstract and translation of JP 2004-046329 A.
Japan Office action, dated Sep. 6, 2011 along with an english translation thereof.
Japan Office action, dated Nov. 22, 2011 along with an english translation thereof.

* cited by examiner

*Primary Examiner* — Yon Couso
(74) *Attorney, Agent, or Firm* — Greenblum & Bernstein, P.L.C.

(57) ABSTRACT

An edge-enhancement device for subjecting input image data to edge enhancement so as to generate output image data has an edge-component generator, a weighting processor, and an addition processor. The input image data is obtained from a frame image having a plurality of pixels, and the input image data contains luminance data. The edge-component generator generates an edge component of the input image data. The weighting processor applies a weight according to the value of the luminance data of each pixel to a calculated edge component of each pixel so as to generate a weighted edge component for each pixel. The addition processor adds the weighted edge component of each pixel to the input image data of the pixel so as to generate the output image data.

12 Claims, 5 Drawing Sheets

FIG. 3

|  |  |  |  |  |
|---|---|---|---|---|
| Ps | Ps | Ps | Ps | Ps |
| Ps | Ps | Ps | Ps | Ps |
| Ps | Ps | P0 | Ps | Ps |
| Ps | Ps | Ps | Ps | Ps |
| Ps | Ps | Ps | Ps | Ps |

| LUMINANCE VAL. | COE. |
|---|---|
| 0 | 0.25 |
| 1 | 0.25 |
| . . | . . |
| 16 | 0.5 |
| . . | . . |
| 32 | 1.0 |
| . . | . . |
| 128 | 0.5 |
| . . | . . |
| 255 | 0.25 |

EDGE-ENHANCEMENT DEVICE AND EDGE-ENHANCEMENT METHOD

BACKGROUND OF THE INVENTION

1. Field of the Invention

The present invention relates to an edge-enhancement device which enhances edges in an image captured by an imaging apparatus such as an endoscope, and an edge-enhancement method for enhancing the edges in an image.

2. Description of the Related Art

Conventionally, an original image signal captured by an image sensor in an imaging apparatus such as an endoscope is subjected to edge enhancement in order to emphasize subject contours in the image, and is then displayed on a monitor as an output image. In edge enhancement, the so-called edge component of each target pixel, generated on the basis of the difference between the luminance of the target pixel and the luminance of the surrounding pixels, is added to the luminance of the target pixel.

When the difference in luminance between the target pixel and the surrounding pixels is large in the original image signal, the luminance of the target pixel becomes large in the output image. Hence, the contours in the image are clearer in the output image.

However, in high-luminance areas of the original image, the luminance value may sometimes be increased to excess by the edge enhancement, causing cat's-eye or halation. Furthermore, in the low-luminance areas of the original image, noise may also be over-emphasized.

Japanese Unexamined Patent Publication (KOKAI) No. 2004-46329 discloses that the edge component of the target pixel is weighted according to the luminance difference between the target pixel and the adjoining pixel, and the weighted edge component is added to the luminance value of the target pixel so to produce an edge-enhanced image. In this edge enhancement, when the luminance difference between the target pixel and the adjoining pixels is small or large, the weight becomes small, but when the difference is medium, the weight becomes large. Hence, the pixels with luminance values which differ greatly from the adjoining pixels are not enhanced strongly, which reduces halation in the high-luminance image areas and reduces noise emphasis in the low-luminance image areas.

However, in the above-mentioned edge enhancement, since the luminance value is weighted according to the luminance difference between the target pixel and the adjoined pixels, when one or more pixel luminance values have false values due to noise, the false luminance value influences not only the same pixel, but also the other surrounding pixel values, which results in an unacceptable increase in noise.

Furthermore, the image is usually rendered in the middle of the luminance value range, but the contour of the subject is not always represented by a medium luminance difference. Therefore, the contours of the subject are not always emphasized appropriately by the above-mentioned edge enhancement.

SUMMARY OF THE INVENTION

Therefore, an object of the present invention is to provide an edge-enhancement device which can emphasize the contours of the subject appropriately while noise emphasis in the low-luminance areas and cat's eye and halation in high-luminance areas are prevented.

According to the present invention, there is provided an edge-enhancement device for subjecting input image data to edge enhancement so as to generate output image data. The input image data is obtained from a frame image having a plurality of pixels, and it contains luminance data. The edge enhancement has an edge-component generator, a weighting processor, and an addition processor. The edge-component generator generates the edge component for the input image data. The weighting processor applies a weight according to the luminance value of each of the pixels, to the edge component of the pixel, so as to generate a weighted edge component for each pixel. The addition processor adds the weighted edge component of each pixel to the input image data of the pixel so as to generate the output image data.

BRIEF DESCRIPTION OF THE DRAWINGS

The objects and advantages of the present invention will be better understood from the following description, with reference to the accompanying drawings in which:

FIG. 3 is a schematic view showing a reference matrix area;

FIG. 4 shows a look-up table for the coefficient determiner;

DESCRIPTION OF THE PREFERRED EMBODIMENTS

Figure 1:
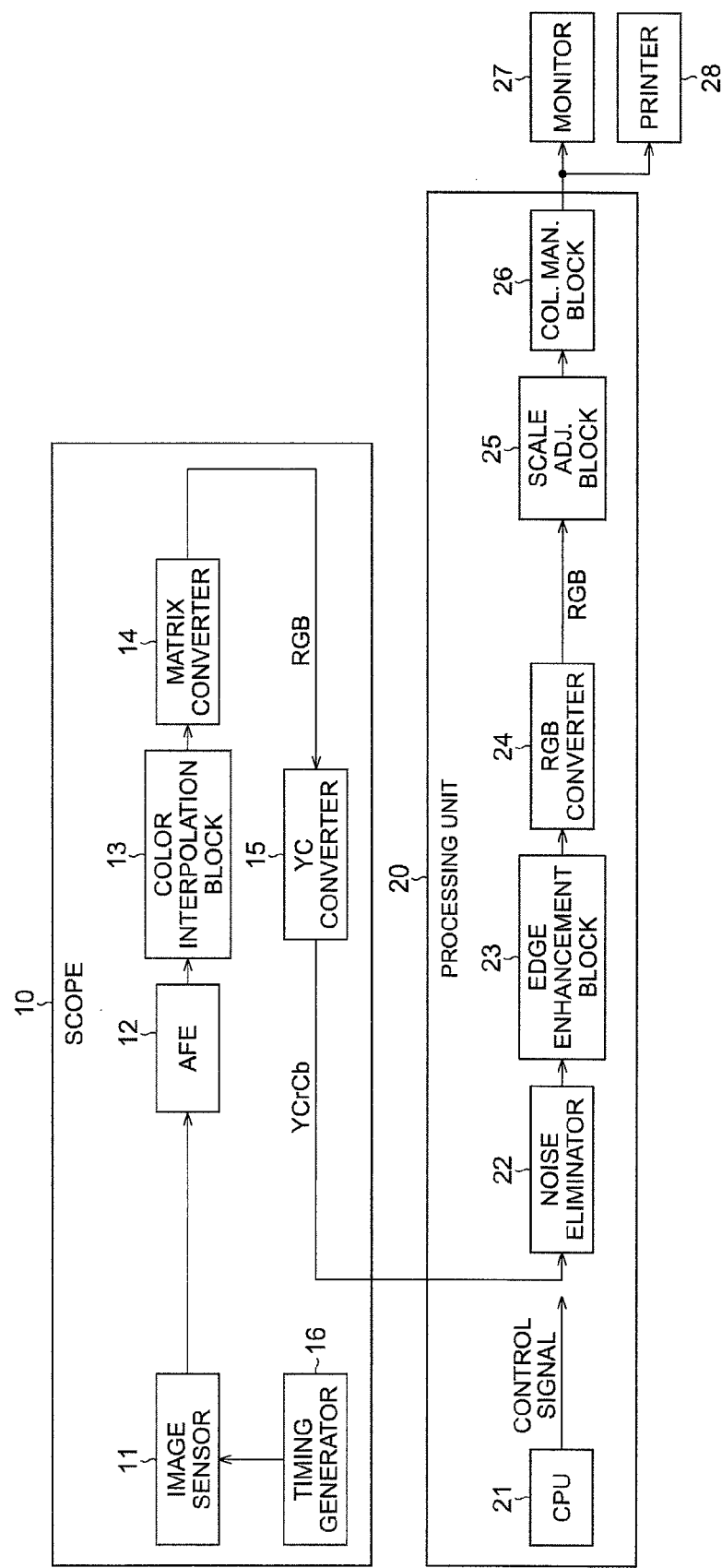
FIG. 1 is a block diagram of an endoscope system to which one embodiment of the present invention is applied.

The present invention will be described below with reference to the embodiments shown in the drawings.

FIG. 1 shows an endoscope system including an edge-enhancement device in one embodiment of this invention. The endoscope system comprises a videoscope 10 and an image-processing unit 20. The videoscope 10 is an imaging apparatus for capturing an image of a subject. The image-processing unit 20 produces an output image which is sent to an output apparatus such as a monitor 27 or a printer 28, based on the image data captured by the scope 10.

The videoscope 10 includes an image sensor 11 such as a CCD. An image is formed on the image sensor 11 by the light from the subject. At the image sensor 11, electric charge representing the image is stored and read out as an analog image signal. The timing of storing and reading in the image sensor 11 is controlled by a timing generator 16.

In the videoscope 10, the analog image signal is converted to digital image data by an AFE (analog front end) 12. The digital image data is subjected to color interpolation at a color interpolation block 13. Next, the digital image data is converted to RGB image data including R data, G data, and B data through matrix conversion at a matrix converter 13. Then, the RGB image data is input to a YC converter 15. At the YC converter 15, the RGB image data is converted to luminance data Y and chrominance data Cb and Cr. The luminance data Y and chrominance data Cb and Cr are sent to the image-processing unit 20 as image data.

The image-processing unit 20 has a CPU 21 which outputs control signals and controls the image-processing unit 20. In the image-processing unit 20, the noise in the image data (the luminance data Y and chrominance data Cb and Cr) is eliminated at a noise eliminator 22 such as an LPF (low-pass filter). After eliminating the noise, the image data is input to an edge-enhancement block 23. The luminance data Y is subjected to edge enhancement as described below, but chrominance data Cb and Cr is not subjected to edge enhancement at the edge-enhancement block 23.

After edge enhancement, the luminance data Y and chrominance data Cb and Cr are converted to RGB image data including R data, G data, and B data at an RGB converter 24. The RGB image data is subjected to image-size adjustment at a scale adjustment block 25 and then is subjected to color adjustment at a color management block 26. After that, the color signals are output to a monitor 27 or a printer 28 as an output image.

Figure 2:
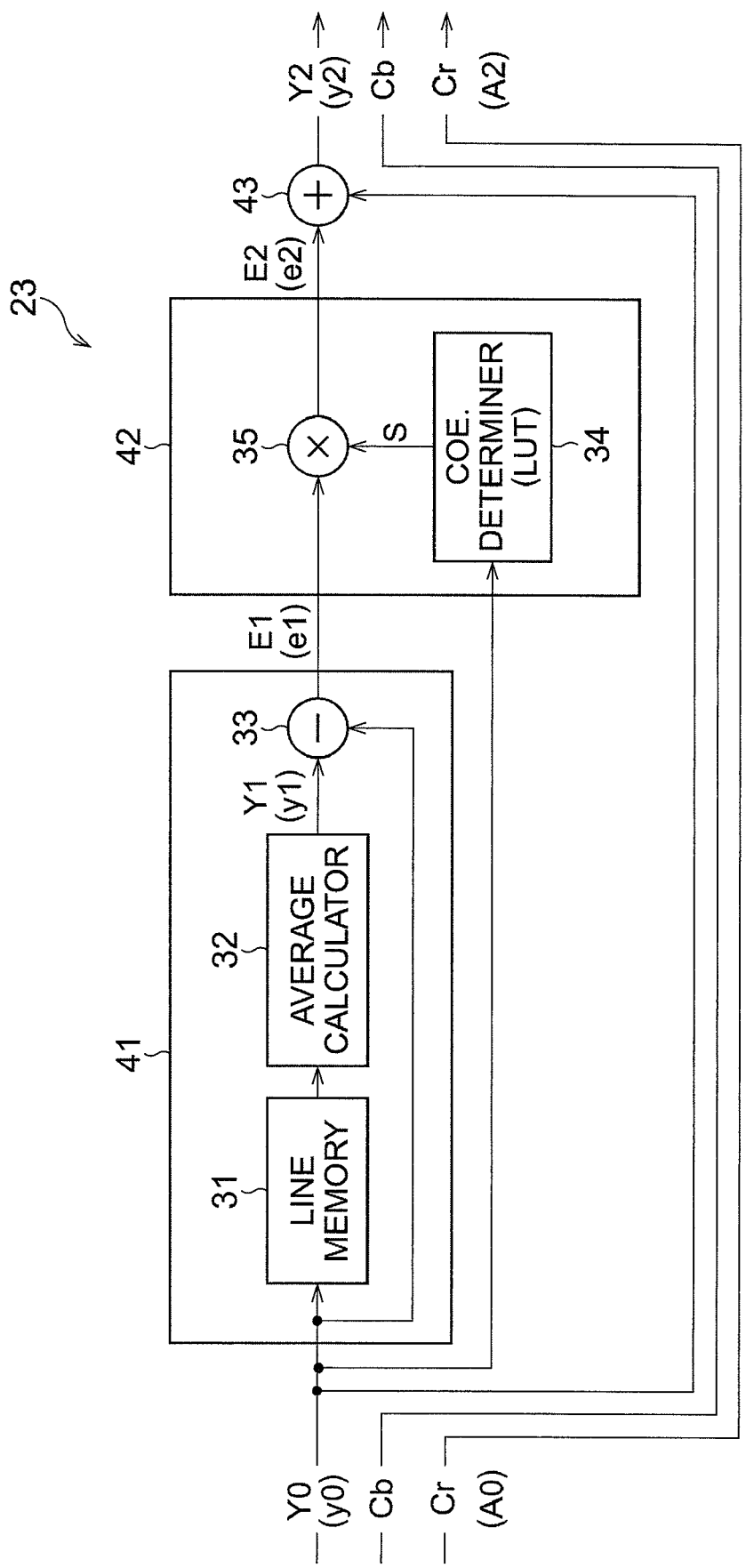
FIG. 2 is a block diagram showing an edge-enhancement block in the endoscope system.

FIG. 2 is a block diagram showing the edge-enhancement block 23. Hereinafter, the image data, including the luminance data Y and the chrominance data Cb and Cr, which is input to the edge-enhancement block 23, is called "input image data A0". The luminance data Y of the input image data A0 is called "input luminance data Y0". The luminance data Y, which has been subjected to edge enhancement at the block 23 and which is output from the block 23, is called "output luminance data Y2". Next, the case in which the input luminance data Y0 is 8-bit digital data will be described.

In this embodiment, the image sensor 11 is formed of M×N pixels (M, the number of lines; N, the number of columns). Therefore, the input image data A0 comprises M×N pixels, each of which contains a pixel luminance value and chrominance values (Cb and Cr pixel values), forming a frame image having a plurality of pixels. Hence, the input luminance data Y0 comprises the M×N input pixel luminance values y0, each corresponding to a pixel of the frame image. Namely, all of input pixel luminance values y0 (the luminance data of each of the pixels) constitute luminance data Y0 of the whole frame image.

The edge-enhancement block 23 comprises an edge component generation circuit 41 including a line memory 31, an average calculator 32, a subtracter 33; a weighting circuit 42 including a coefficient determiner 34 having a look-up table, a multiplier 35; and an adder 43. The input luminance data Y0 is subjected to an edge-component generation process so as to generate edge component data E1 with the edge-component generation circuit 41, and then the edge component data E1 is weighted at the weighting circuit 42 so as to generate weighted edge component data E2, as described below in detail.

The input pixel luminance values y0 of the input luminance data Y0 are input to the edge-component generation circuit 41, the weighting circuit 42, and the adder 43. At the edge-component generation circuit 41, the input pixel luminance values y0 are input to both the line memory 31 and the subtracter 33, successively for each pixel. The line memory 31 temporarily stores at least 5×N input pixel luminance values (namely, input luminance data Y0 in an area of at least 5 lines by N columns). Due to this, the line memory 31 can simultaneously output the input luminance data Y0 of a 5×5 matrix area (5×5 input pixel luminance values) to the average calculator 32.

As shown in FIG. 3, in the edge-enhancement block 23, each pixel in the frame image is successively defined as a target pixel P0. The 5×5 matrix area whose center is the defined target pixel P0 is defined as a 5×5 reference matrix area R1. In addition, pixels surrounding the defined target pixel P0 in the 5×5 reference matrix area R1 are defined as surrounding pixels Ps.

The line memory 31 outputs the 5×5 input pixel luminance values of the 5×5 reference matrix area R1 to the average calculator 32 successively, every when the target pixel P0 is defined. Namely, the line memory 31 outputs the input pixel luminance values of the target pixel P0 and of surrounding pixels Ps.

The average calculator 32 calculates an average of the input luminance data Y0 (namely, the 5×5 input pixel luminance values) in each reference 5×5 matrix area R1. The average is the arithmetic average of the input luminance value Y0 in the reference 5×5 matrix area R1, but may also be a weighed average.

The average is a high-cut pixel value y1 of the target pixel P0 (high-cut data of one pixel). The averages are generated for all target pixels P0. The high-cut pixel values y1 of all target pixels P0 constitute high-cut data Y1 of the frame image. The high-cut data Y1 is the luminance component which is obtained by cutting the high-frequency component from the input luminance data Y0, with the above-mentioned averaging.

The high-cut pixel value y1 is input to the subtracter 33 for each pixel. At the subtracter 33, the high-cut pixel value y1 of each target pixel P0 is subtracted from the input pixel luminance value y0 of each target pixel P0, so as to generate the edge component pixel value e1 of each target pixel P0 (the edge component data for one pixel). The edge component pixel values e1 of all target pixels P0 are generated. The edge component pixel values e1 of all target pixels constitute the edge component data E1 of the frame image.

It is clear from the explanation above that the edge component data E1 is the luminance edge component which is generated by subtracting the high-cut data Y1 from the input luminance data Y0 of the frame image (E1=Y0−Y1). The edge component data E1 represents the edges in the image, because the edge component pixel value e1 represents the difference between the luminance value of the target pixel P0 and the luminance value of the surrounding pixels Ps.

At the weighting block 42, the input pixel luminance values y0 are input to the coefficient determiner 34. The coefficient determiner 34 determines a weighted coefficient S, per defined target pixel P0, according to the input pixel luminance value y0 of the defined target pixel P0, using the data in the look-up table. The determined weighted coefficient S is output to the multiplier 35.

At the multiplier 35, the edge component pixel value e1 of each target pixel P0 is multiplied by the determined weighted coefficient S of each target pixel P0, and then a weighted edge component pixel value e2 of each target pixel P0 (weighted edge component data for one pixel) is generated. The weighted edge-component pixel values e2 are generated for all target pixels P0. The weighted edge component pixel values e2 of all target pixels P0 constitute the weighted edge component data E2 of the frame image. (E2=E1×S)

Next, the process of determining the weight coefficient will be described in detail, referring to FIGS. 4 and 5. In the look-up table, as shown in FIG. 4, luminance values from the minimum value (0) to the maximum value (255) and coefficients corresponding to each luminance value, are stored. The standard luminance value (32) corresponds to the coefficient having the maximum value (1.0). All luminance values (0 to 31 and 33 to 255) less than or greater than the standard luminance value of 32 have a coefficient less than the maximum value of 1.0. Furthermore, the coefficient gets smaller as a luminance value gets away from the standard value of 32.

The coefficient determiner 34 determines the weighted coefficient S of the target pixel P0 for the coefficient corresponding to the input pixel luminance value y0 of the target pixel P0 in the look-up table. The determined weighted coefficient S is then output to the multiplier 35.

Figure 5:
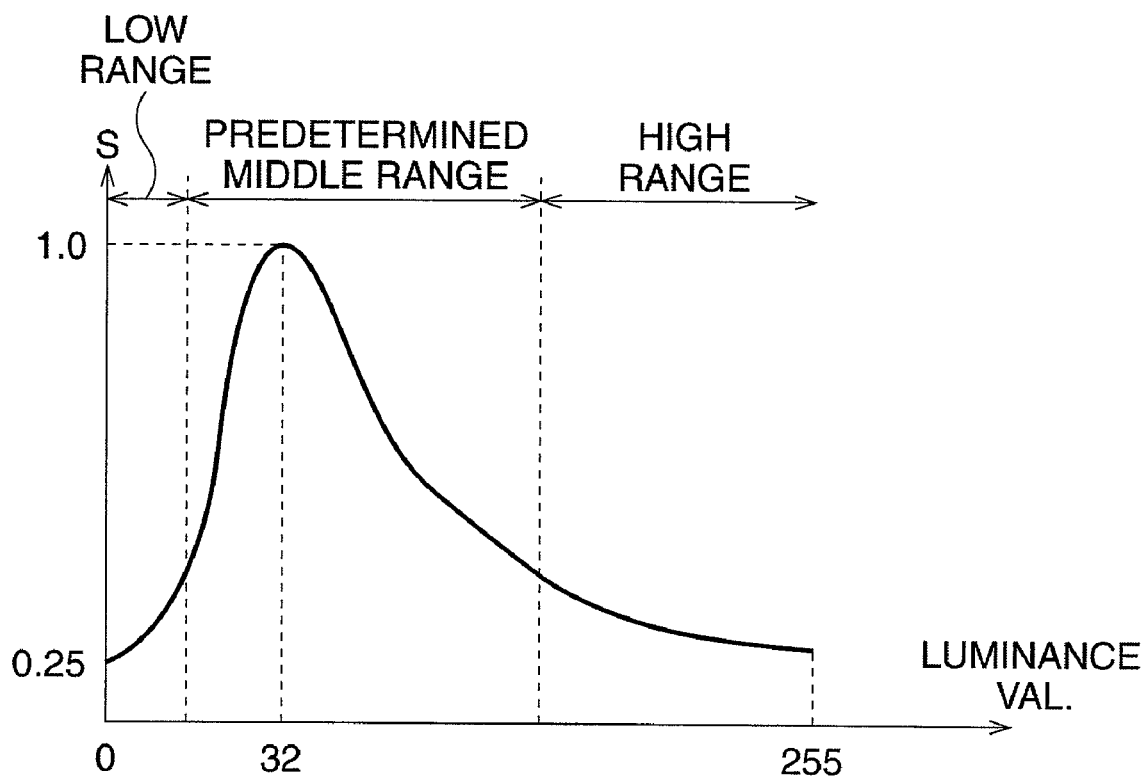
FIG. 5 is a graph illustrating the data in the look-up table.

Namely, as shown in FIG. 5, when the input pixel luminance value y0 of the target pixel P0 is in a predetermined middle range, the coefficient determiner 34 chooses a relatively larger weighted coefficient S, which is then output to the multiplier 35. Hence, a relatively greater weight is applied to the edge component pixel value e1 of the target pixel P0 when the input pixel luminance value y0 of the target pixel P0 is in the middle luminance range.

In contrast, when the pixel luminance value y0 of the target pixel P0 is less or greater than the middle range, namely when the luminance value is in the low range or high range, the coefficient determiner 34 determines the relatively smaller weighted coefficient S, and then the relatively smaller weighted coefficient is output to the multiplier 35. Thereby, a relatively smaller weight is applied to the edge component pixel value e1 of the target pixel P0 when the input pixel luminance value y0 of the target pixel P0 is in the low or high luminance ranges.

Specifically, the determined weight coefficient S of the target pixel P0 is greatest when the luminance value of the pixel luminance value y0 of the target pixel P0 equals the predetermined value (32) in the predetermined value. The determined weight coefficient S of the target pixel P0 is relatively smaller when the difference between the predetermined value (32) and the input pixel luminance value y0 of the target pixel P0 is relatively larger, as shown in FIGS. 4 and 5.

The input pixel luminance value y0 and the weighted edge component pixel value e2, which correspond to the same target pixel P0, are input to the adder 43 simultaneously. At the adder 43, the weighted edge component pixel value e2 is added to the input pixel luminance value y0, which results in an output pixel luminance value y2 for each target pixel P0 (output luminance data of one pixel). The output pixel luminance values y2 are generated for all target pixels P0. The output pixel luminance values y2 for all target pixels P0 constitute the output luminance data Y2 of the frame image. The output luminance data Y2 and the chrominance data Cb and Cr is output to the RGB converter 24, as output image data A2 (refer to FIG. 1).

The chrominance data Cb and Cr contained in the input image data A0 are not subjected any image processing at the edge-enhancement block 23. Therefore, at the RGB converter 24, RGB image data including R data, G data, and B data are produced from the output luminance data Y2 which is subjected to edge enhancement as described above and the chrominance data Cb and Cr which are not subjected to edge enhancement.

Figure 6:
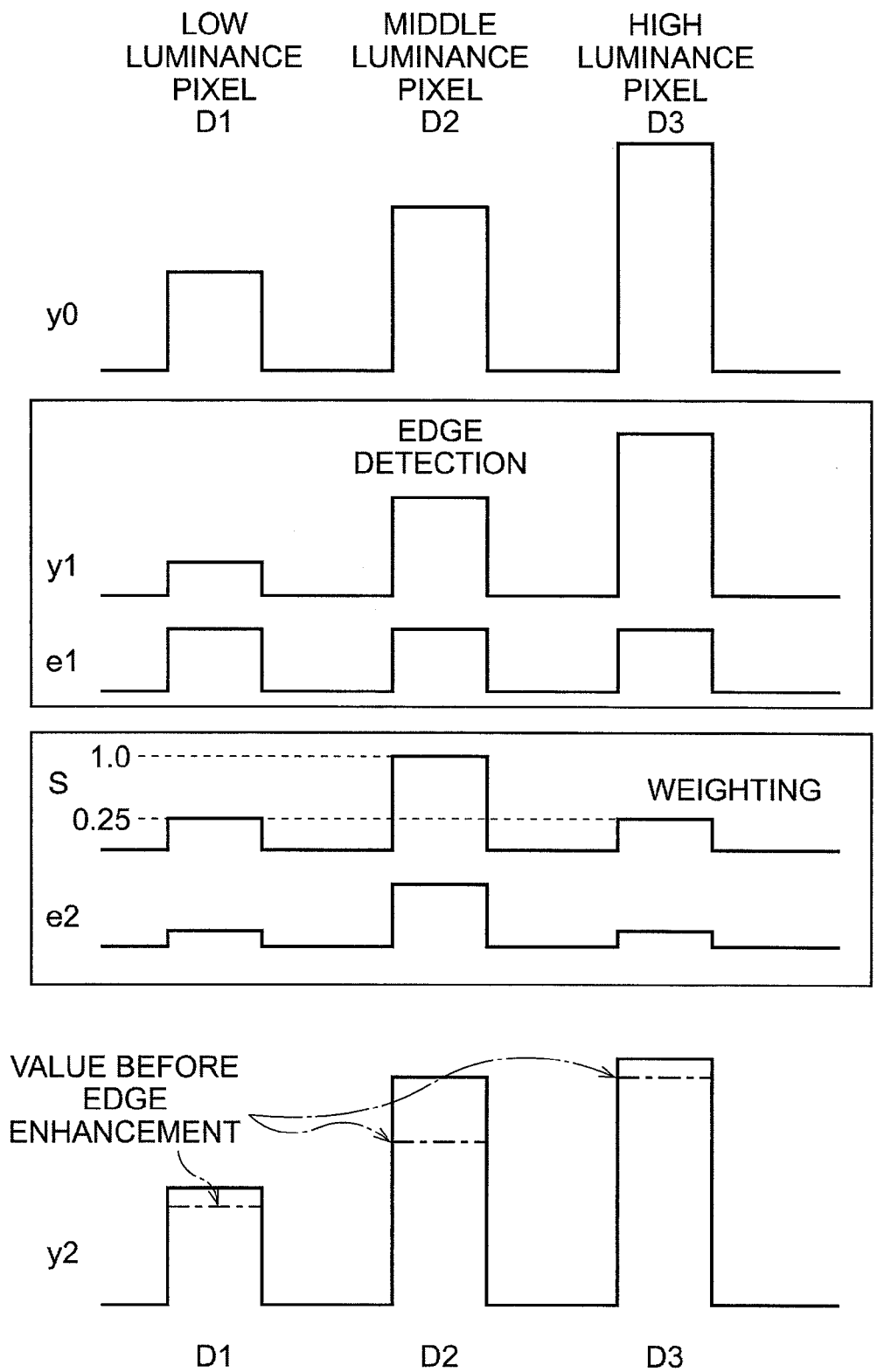
FIG. 6 is a schematic view of a signal process which is carried out in the edge-enhancement block.

FIG. 6 is a schematic view of a signal process in the edge-enhancement block 23. FIG. 6 shows the input pixel luminance values y0 in a low-luminance pixel D1, a middle luminance pixel D2, and a high-luminance pixel D3, having low-level, middle-level, and high-level luminance values, respectively.

In the case that the luminance differences between the target pixels P0 and their neighbors are reasonably similar for each of pixels D1, D2 and D3, the edge component pixel values e1 of the pixels D1, D2, and D3, which are obtained by subtracting the high-cut pixel value y1 from the input pixel luminance value y0 will be at the same level, as shown in FIG. 6.

On the other hand, the determined weighted coefficient S of the middle luminance pixel D2 is relatively higher, but those of the low and high-luminance pixels D1 and D3 are relatively lower. In FIG. 6, the determined weighted coefficient S of the middle luminance pixel D2 is 1.0, and that of the low and high-luminance pixels D1 and D3 is 0.25. Hence, the strength of the edge component is maintained in the middle luminance pixel D2, but is weakened in the low and high-luminance pixels D1 and D3, while the edge component pixel value e1 is weighted so as to generate weighted edge component pixel value e2.

Therefore, the pixel luminance values in the middle luminance pixel D2 are subjected to relatively larger edge enhancement, but the pixel luminance values in the low and high-luminance pixels D1 and D3 are subjected to relatively smaller edge enhancement.

Generally, the middle luminance pixel(s) D2 usually represent the features of the subject. Accordingly, in this embodiment, the subject feature contours will be sufficiently emphasized because the pixel values in the middle luminance pixels D2 are subjected to the relatively stronger edge enhancement. On the other hand, noise emphasis is prevented in the low-luminance image areas, because the pixel values of the low-luminance pixels D1 are subjected to relatively weaker edge enhancement.

Also, the image data of the high-luminance pixels D3 is subjected to relatively weaker edge enhancement, which prevents cat's eye or halation in the high-luminance areas. In an endoscope system, some parts of an organ inside the human body on which water or liquid is present, will reflect light strongly. Hence, such parts are generally observed as high-luminance areas, and cat's eye or halation may be generated at the edges of such parts. Accordingly, when the imaging apparatus is an endoscope, it is preferable to weaken the edge enhancement in the high-luminance pixels D3, in order to reduce cat's eye or halation.

In addition, the weighted coefficient S of the target pixel P0 which multiplies the edge component pixel value e1 is determined by reference only the luminance value of the target pixel P0. Therefore, even if some pixel has a false luminance value due to the influence of noise, such false luminance value will not affect other pixels, thus preventing noise from increasing too much.

Alternatively, the weighted coefficient S might be determined not by the look-up table shown in FIGS. 4 and 5, but instead changed according to the characteristic of the image sensor 11 or the characteristics of the subject. Furthermore, the weighted coefficient S may be set to 0 when the luminance value of the target pixel P0 is smaller or greater than the predetermined range, and the input pixel luminance value y0 of the low or high-luminance pixels D1 and D3 will thereby not be subjected to edge enhancement.

In this embodiment, the size of the reference matrix area R1 is 5×5 but may be of another size, such as k×k, where k is an odd integer greater than or equal to 3. Furthermore, the average calculator 32 generates the high-cut data Y1 by averaging the luminance value in the reference matrix area in this embodiment. However, another process may be used for generating the high-cut data Y1. For example, another low-pass filter which cuts the high-frequency component may be used.

The edge component data E1 may be obtained by the edge-component generation circuit 41 by using a processor other than the above-mentioned processor. For example, the edge component data may be obtained by a second-order differential such as a laplacian filter or by a first-order differential.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2007-184008 (filed on Jul. 13, 2007) which is expressly incorporated herein, by reference, in its entirety.

The invention claimed is:

1. An edge-enhancement device for subjecting input image data to edge enhancement so as to generate output image data, said input image data forming a frame image having a plurality of pixels, said input image data containing luminance data, said device comprising:
   an edge-component generator that calculates an edge component of said input image data;
   a weighting processor that applies a weight according to the value of said luminance data of each of said pixels to said edge component of each pixel so as to generate a weighted edge component for each of said pixels; and
   an addition processor that adds said weighted edge component for each of said pixels to said input image data so as to generate said output image data,
   wherein said edge-component generator generates said edge component based on said luminance data, and
   said edge-component generator cuts a high-frequency component from said luminance data so as to generate high-cut data, and then subtracts said high-cut data from said luminance data so as to generate said edge component.

2. An edge-enhancement device according to claim 1, wherein said weight is relatively greater when the value of said luminance data of each pixel is in a predetermined range, and said weight is relatively smaller when the value of said luminance data of each pixel is less or greater than a predetermined range.

3. An edge-enhancement device according to claim 1, wherein said weight is greatest when the value of said luminance data of each pixel is a predetermined value in a predetermined range, and said weight is relatively smaller when the difference between said predetermined value and the value of said luminance data of each pixel is relatively larger.

4. An edge-enhancement device according to claim 1, wherein said weighting processor multiplies said edge component for each of said pixels by a weighted coefficient that is determined according to the value of said luminance data of each of said pixels, so as to generate said weighted edge component for each of said pixels.

5. An edge-enhancement device according to claim 1, wherein each of said pixels is defined as a target pixel,
   said edge-component generator generates said edge component for said target pixel,
   said weighting processor applies said weight according to the value of said luminance data of said target pixel to said edge component for said target pixel so as to generate said weighted edge component for said target pixel; and
   said addition processor adds said weighted edge component for said target pixel to said input image data of said target pixel so as to generate said output image data for said target pixel.

6. An edge-enhancement device for subjecting input image data to edge enhancement so as to generate output image data, said input image data forming a frame image having a plurality of pixels, said input image data containing luminance data, said device comprising:
   an edge-component generator that calculates an edge component of said input image data;
   a weighting processor that applies a weight according to the value of said luminance data of each of said pixels to said edge component of each pixel so as to generate a weighted edge component for each of said pixels; and
   an addition processor that adds said weighted edge component for each of said pixels to said input image data so as to generate said output image data,
   wherein said edge-component generator generates said edge component based on said luminance data,
   each of said pixels is defined as a target pixel,
   and said edge-component generator obtains an average of said luminance data in a predetermined image area whose center is said target pixel, and then subtracts said average from the luminance data of said target pixel so as to generate said edge component for said target pixel.

7. An edge-enhancement device according to claim 6, wherein said weight is relatively greater when the value of said luminance data of each pixel is in a predetermined range, and said weight is relatively smaller when the value of said luminance data of each pixel is less or greater than a predetermined range.

8. An edge-enhancement device according to claim 6, wherein said weight is greatest when the value of said luminance data of each pixel is a predetermined value in a predetermined range, and said weight is relatively smaller when the difference between said predetermined value and the value of said luminance data of each pixel is relatively larger.

9. An edge-enhancement device according to claim 6, wherein said weighting processor multiplies said edge component for each of said pixels by a weighted coefficient that is determined according to the value of said luminance data of each of said pixels, so as to generate said weighted edge component for each of said pixels.

10. An edge-enhancement device according to claim 6, wherein
    said edge-component generator generates said edge component for said target pixel,
    said weighting processor applies said weight according to the value of said luminance data of said target pixel to said edge component for said target pixel so as to generate said weighted edge component for said target pixel; and
    said addition processor adds said weighted edge component for said target pixel to said input image data of said target pixel so as to generate said output image data for said target pixel.

11. An edge-enhancement method for subjecting input image data to edge enhancement so as to generate output image data, said input image data forming a frame image having a plurality of pixels, said input image data containing luminance data, said method comprising:
    generating, by an edge-component generator, an edge component of said input image data based on said luminance data, by cutting a high-frequency component from said luminance data so as to generate high-cut data, and then subtracting said high-cut data from said luminance data;
    applying, by a weighting processor, a weight according to the value of said luminance data of each of said pixels to said edge component of the pixel so as to generate a weighted edge component for each of said pixels; and
    adding, by an addition processor, said weighted edge component for each of said pixels to said input image data of said pixel so as to generate said output image data.

12. An edge-enhancement method for subjecting input image data to edge enhancement so as to generate output image data, said input image data forming a frame image having a plurality of pixels, said input image data containing luminance data, said method comprising:
    generating, by an edge-component generator, an edge component of said input image data based on said luminance data, by defining each of said pixels as a target pixel, obtaining an average of said luminance data in a predetermined image whose center is said target pixel, and then subtracting said average from the luminance data of said target pixel so as to generate said edge component for said target pixel;

applying, by a weighting processor, a weight according to the value of said luminance data of each of said pixels to said edge component of the pixel so as to generate a weighted edge component for each of said pixels; and adding, by an addition processor, said weighted edge component for each of said pixels to said input image data of said pixel so as to generate said output image data.

* * * * *